US012665540B2

(12) United States Patent
Guha et al.

(10) Patent No.: US 12,665,540 B2
(45) Date of Patent: Jun. 23, 2026

(54) STRATEGIES TO ENHANCE CRITICAL WIND SPEEDS WITH ACTIVE STOWING IN SINGLE AXIS SOLAR TRACKING SYSTEMS

(71) Applicant: Nextpower LLC, Fremont, CA (US)

(72) Inventors: Tushar Guha, Milpitas, CA (US); Abhimanyu Sable, Hyderabad (IN); Asher Dakarapu, Lingampally (IN); Jacob Mark Morin, Phoenix, AZ (US)

(73) Assignee: Nextpower LLC, Fremont, CA (US)

( * ) Notice: Subject to any disclaimer, the term of this patent is extended or adjusted under 35 U.S.C. 154(b) by 307 days.

(21) Appl. No.: 18/454,599

(22) Filed: Aug. 23, 2023

(65) Prior Publication Data

US 2024/0072720 A1 Feb. 29, 2024

Related U.S. Application Data

(60) Provisional application No. 63/400,612, filed on Aug. 24, 2022.

(51) Int. Cl.
| | |
|---|---|
| *H02S 20/32* | (2014.01) |
| *F24S 30/00* | (2018.01) |
| *F24S 30/425* | (2018.01) |

(52) U.S. Cl.
CPC ............ *H02S 20/32* (2014.12); *F24S 30/425* (2018.05); *F24S 2030/12* (2018.05); *F24S 2030/19* (2018.05)

(58) Field of Classification Search
CPC .......... H02S 20/00; H02S 20/10; H02S 20/32; F24S 30/425; F24S 2030/12; F24S 2030/19
See application file for complete search history.

(56) References Cited

U.S. PATENT DOCUMENTS

| | | | | |
|---|---|---|---|---|
| 6,058,930 | A * | 5/2000 | Shingleton | F24S 30/425 126/600 |
| 2008/0251115 | A1* | 10/2008 | Thompson | F24S 30/425 136/251 |
| 2016/0308488 | A1 | 10/2016 | Liu et al. | |
| 2018/0254740 | A1* | 9/2018 | Corio | F16F 1/3821 |
| 2020/0228054 | A1 | 7/2020 | Au | |
| 2020/0386294 | A1 | 12/2020 | Plesniak | |

FOREIGN PATENT DOCUMENTS

| | | |
|---|---|---|
| WO | 2022120030 A1 | 6/2022 |

OTHER PUBLICATIONS

International Search Report and Written Opinion of the International Application No. PCT/US2023/072753, mailed Dec. 1, 2023, 13 pg.

* cited by examiner

*Primary Examiner* — Mayla Gonzalez Ramos
(74) *Attorney, Agent, or Firm* — Fredrikson & Byron, P.A.

(57) ABSTRACT

A solar tracking system includes a first solar tracking row and a second solar tracking row, each of the first and second solar tracking rows including a plurality of support piers, a torque tube rotatably supported on the plurality of support piers, a plurality of solar modules coupled to the torque tube, and at least one damper coupled to the plurality of support piers at a first end and coupled to a portion of the torque tube at a second, opposite end, and a connecting rod coupled to a portion of each torque tube of the first and second solar trackers such that rotation of the torque tube of the first solar tracker row effectuates movement of the connecting rod, which in turn, effectuates rotation of the torque tube of the second solar tracking row.

18 Claims, 8 Drawing Sheets

Motor Pier　　　　Dampers

Mode 1 Freq = 1.0071Hz

Motor Pier    Dampers

Mode 1 Freq = 1.478Hz

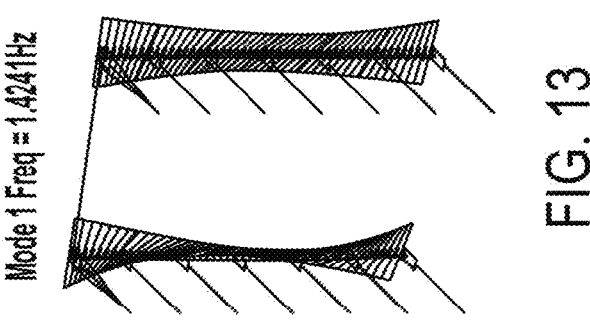
Mode 1 Freq = 1.4241Hz
FIG. 13
Mode 1 Freq = 1.2519Hz
FIG. 12
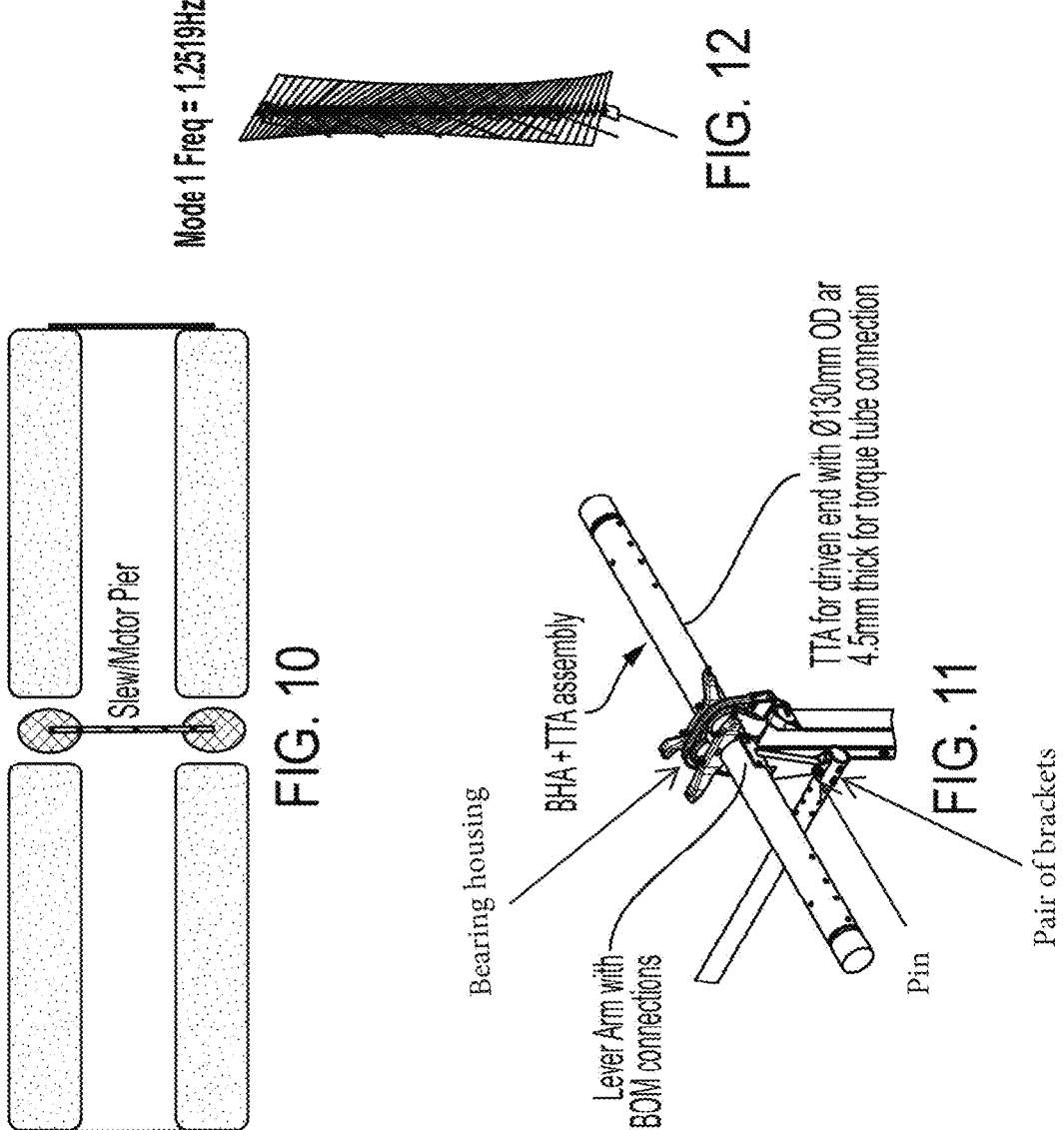
Slew/Motor Pier
FIG. 10
Bearing housing
BHA + TTA assembly
Lever Arm with
BOM connections
TTA for driven end with Ø130mm OD ar
4.5mm thick for torque tube connection
Pin
Pair of brackets
FIG. 11

Mode 1 Freq = 0.72638Hz

Mode 1 Freq = 1.4239Hz

Mode 1 Freq = 1.4239Hz

STRATEGIES TO ENHANCE CRITICAL WIND SPEEDS WITH ACTIVE STOWING IN SINGLE AXIS SOLAR TRACKING SYSTEMS

RELATED MATTERS

This application claims the benefit of U.S. Provisional Patent Application No. 63/400,612, filed Aug. 24, 2022, the entire contents of which are incorporated herein by reference.

BACKGROUND

Technical Field

The present disclosure relates to solar power generation systems, and more particularly, to damping systems and methods for increasing solar tracker stability due to wind loads.

Background of Related Art

Solar cells and solar panels are most efficient in sunny conditions when oriented towards the sun at a certain angle. Many solar panel systems are designed in combination with solar trackers, which follow the sun's trajectory across the sky from east to west in order to maximize the electrical generation capabilities of the systems. The relatively low energy produced by a single solar cell requires the use of thousands of solar cells, arranged in an array, to generate energy in sufficient magnitude to be usable, for example as part of an energy grid. As a result, solar trackers have been developed that are quite large, spanning hundreds of feet in length and including hundreds to thousands of individual solar modules that are mechanically coupled to support structures.

Tortional excitation caused by wind loading exerts significant force upon the structure for supporting and the mechanisms for articulating the solar tracker. As such, increases in the size and number of components to reduce torsional excitation are required at varying locations along the length of the solar tracker. With these concerns in mind prior systems have typically drive the solar modules to a position where the loads created by the wind are reduced, but these typically come at the cost of energy production. For example, one methodology drives all of the solar trackers to a flat or 0 angle position relative to the ground. As can be appreciated, this significantly reduces the amount of energy being produced. The present disclosure seeks to address the shortcomings of prior tracker systems.

BRIEF DESCRIPTION OF THE DRAWINGS

Various aspects and features of the present disclosure are described hereinbelow with reference to the drawings, wherein:

FIG. 10 is a plan view of a solar tracking system having two rows of solar trackers rotatably coupled to one another provided in accordance with the present disclosure;

FIG. 11 is a perspective view of a coupling system, including a connecting rod and a first lever arm, of the solar tracking system of FIG. 10;

FIG. 12 is a plot of oscillations due to wind loading of a single solar tracker row with a single damper provided in accordance with the present disclosure;

FIG. 13 is a plot of oscillations due to wind loading of the solar tracking system of FIG. 10;

DETAILED DESCRIPTION

The present disclosure is directed to damping systems and methods for increasing solar tracker stability due to wind loads. Wind stability of solar tracker system can be affected by several variable. A structure that moves enough in the wind that the motion of the structure changes the wind flow around it is aeroelastic. If this change makes things worse, then it is unstable. This is aeroelastic dynamic instability due to wing. This dynamic instability could happen at wind speeds well below the 300 year return period design wind speed. In embodiments, dampers can be provided at the end piers of the solar tracker to reduce oscillations. Aeroelastic instability tests have been performed to determine critical wind speed (Ucr) for various configurations. Testing may include a static wind tunnel test, a buffeting dynamics study, and/or multirow instability testing. In embodiments, the multirow instability testing is aeroelastic and 1 Hz during the buffeting dynamics study indicates a structure that is not rigid.

As can be appreciated, the critical wind speed (Ucr) for a solar tracker is a wind speed above the tracker that is unstable as it undergoes significant dynamic oscillations. In other words, critic wind speed in single axis solar PV trackers is the threshold wind speed that causes tracker instability (called tortional divergence). Increasing the critical wind speed is a big competitive advantage for a tracker company that may result in one or more benefits such as (1) increased tracker yield, (2) increased tracker lengths (row lengths), (3) lower costs, (4) a reduced amount of material (e.g., steel, etc.) employed to construct the solar trackers, (5) a reduction in the usage of mechanical and electronic components, etc. In embodiments, the critical wind speed of solar trackers can be increased by utilizing single damper rearrangement, using multiple dampers in a wing, connecting rotations of torque tubes at a free end of each solar tracker row, combinations thereof, etc. The present disclosure describes design strategies that can be adopted to increase the critical speed threshold for solar trackers.

Figures 1, 2, 3:
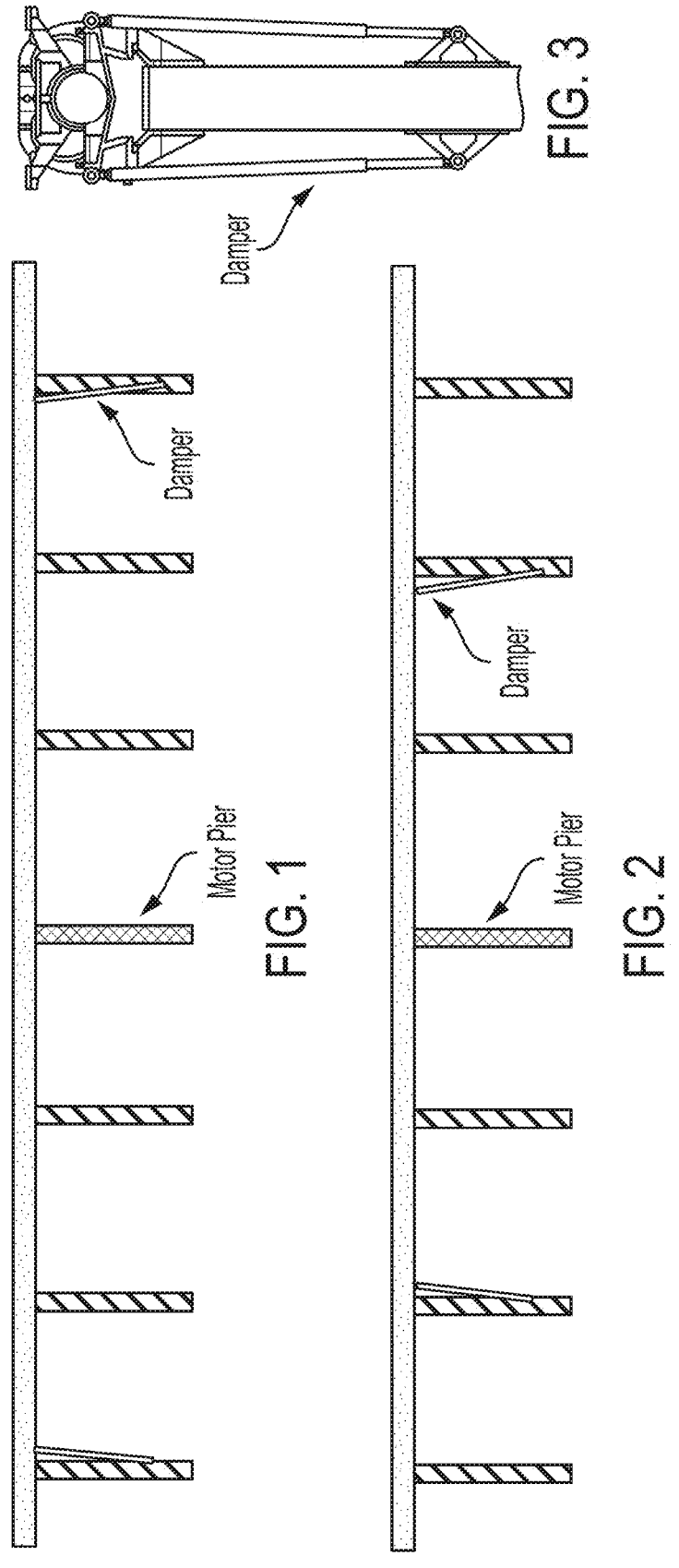
FIG. 1 is a front, elevation view of a solar tracker having a first arrangement of dampers disposed thereon provided in accordance with the present disclosure.
FIG. 2 is a front, elevation view of a solar tracker having a second arrangement of dampers disposed thereon provided in accordance with the present disclosure.
FIG. 3 is a side, elevation view of the dampers of the solar trackers of FIG. 1 and FIG. 2.

Referring now to the drawings, FIG. 1 illustrates a solar tracking system having a first arrangement of dampers disposed thereon. As can be appreciated, the critical wind speed (Ucr) can be increased by rearranging the damper for optimal location, using variable damping, using variable bay spacings, or using variable tube thickness. FIG. 2 illustrates a solar tracking system having a second arrangement of dampers disposed thereon. FIG. 3 illustrates the arrangement of dampers on a pier of the solar tracker and the torque tube rotatably supporting the solar modules of the solar tracker.

Figure 4:
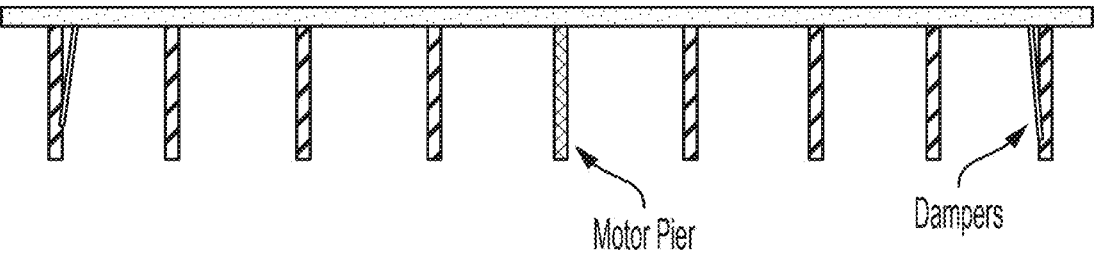
FIG. 4 is a front, elevation view of the solar tracker of FIG. 1.
Figures 5, 6:
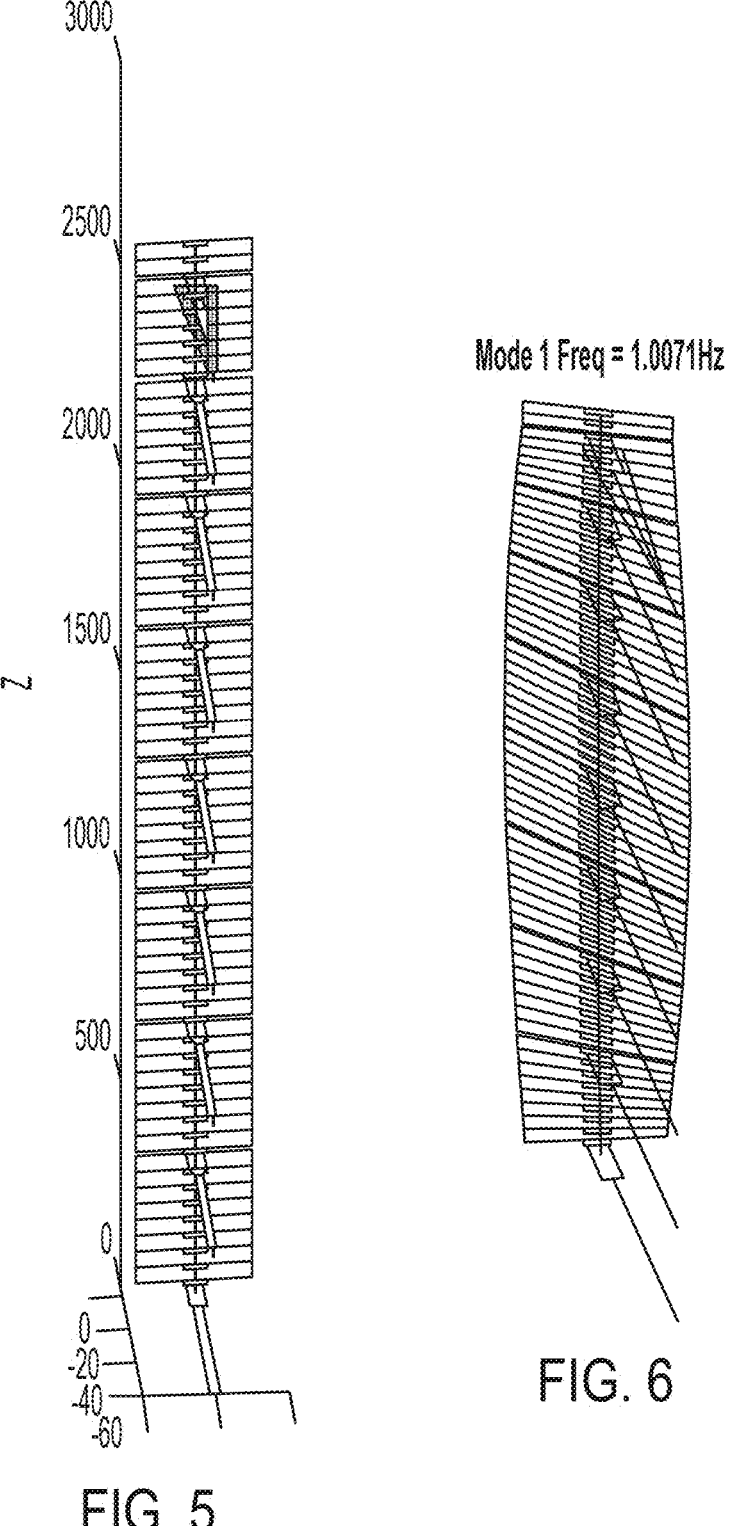
FIG. 5 is a schematic view of a placement of the damper of FIG. 3 on the solar tracker of FIG. 4.
FIG. 6 is a plot of oscillations due to a wind loading of the solar tracker of FIG. 4.

FIG. 4 is another illustration of the solar tracking system of FIG. 1 having a first arrangement of dampers disposed thereon. FIG. 5 is a graphical representation of the placement of the dampers on the solar tracking system of FIG. 4. FIG. 6 is a plot of oscillations of the solar tracking system of FIG. 4 due to a wind loading where the first mode (mode 1) frequency is approximately 1.0071 Hz.

Figure 7:
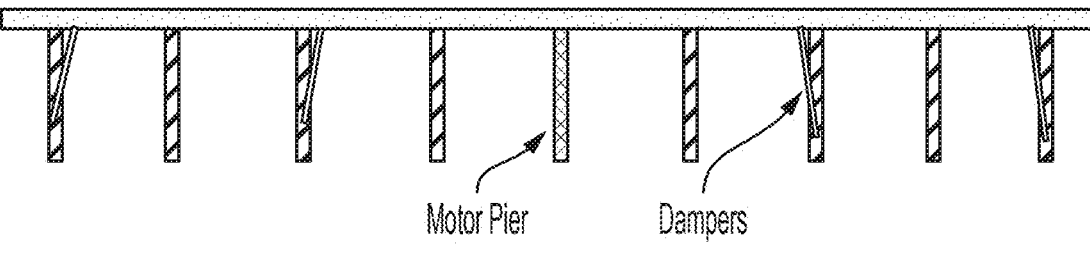
FIG. 7 is a front, elevation view of a solar tracker having a third arrangement of dampers disposed thereon provided in accordance with the present disclosure.
Figures 8, 9:
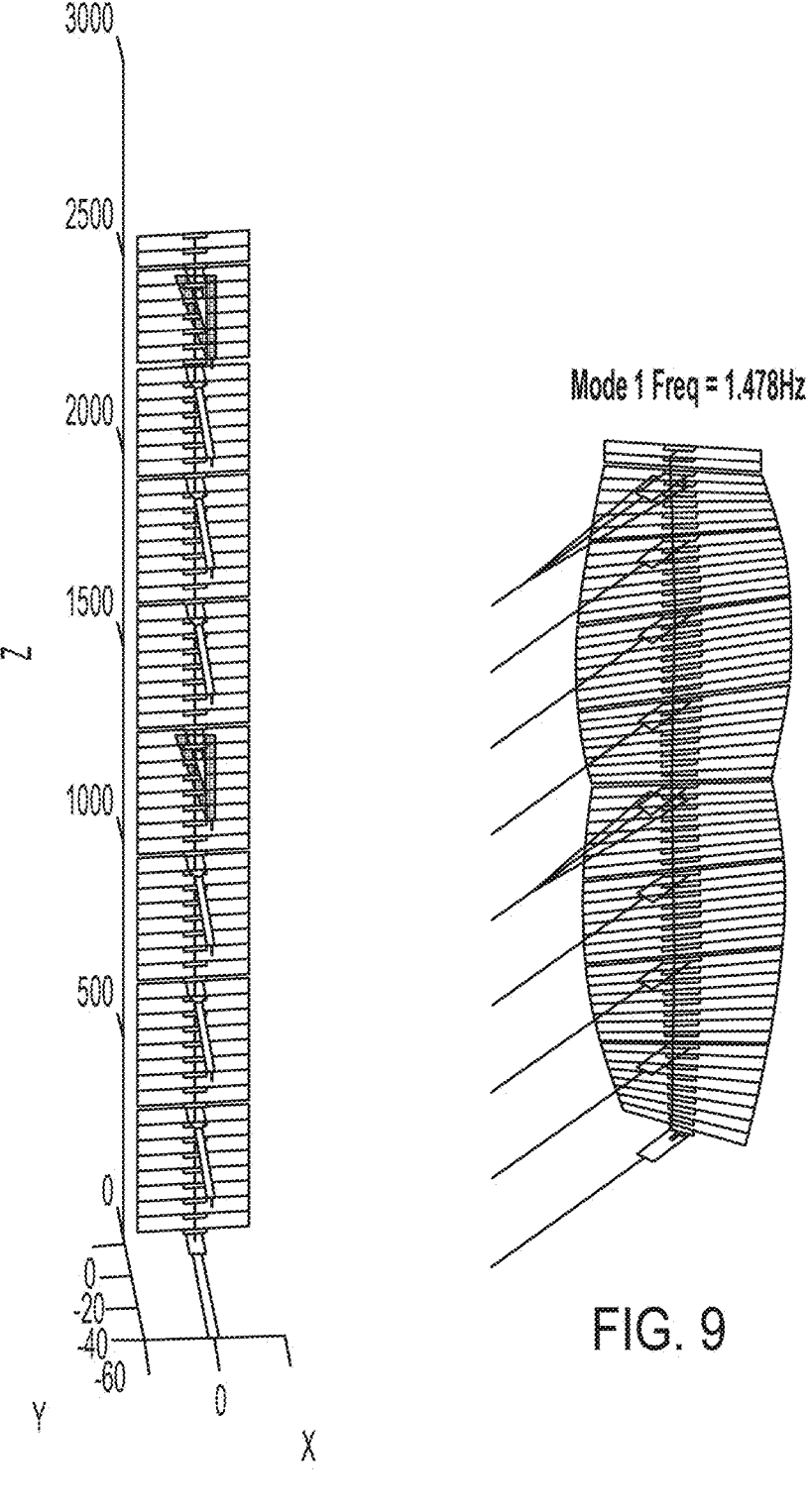
FIG. 8 is a schematic view of a placement of the dampers of FIG. 3 on the solar tracker of FIG. 7.
FIG. 9 is a plot of oscillations due to a wind loading of the solar tracker of FIG. 7.

FIG. 7 is an illustration of another solar tracking system having a third arrangement of dampers disposed thereon. FIG. 8 is a graphical representation of the placement of the dampers on the solar tracking system of FIG. 7. FIG. 9 is a plot of oscillations of the solar tracking system of FIG. 7 due to a wind loading where the first mode (mode 1) frequency of the oscillations is approximately 1.478 Hz.

FIGS. 10 and 11 illustrate a solar tracking system having a pair of solar tracker rows disposed adjacent one another. The ends of each of the solar trackers is connected or coupled to one another by a connecting rod, as shown conceptually at FIG. 10 and a detailed exemplary embodiment of the connecting rod at FIG. 11, such that rotation of a torque tube of one solar tracker effectuates a corresponding rotation of a torque tube of the other solar tracker via the connecting rod. The second, opposite end of the connecting rod that is connected to the torque tube of the second row can be the same as, or similar to, that illustrated at FIG. 11 for the first end of the connecting rod that is shown connected to the torque tube of the first row. As shown for the illustrated embodiment at FIG. 11, the connecting rod can connect to the first torque tube of the first solar tracker row via a first lever arm, and the connecting rod can connect to the torque tube of the second solar tracker row via a second lever arm. Each of the first lever arm and the second lever arm can rotatably connect the respective end of the connecting rod to the respective torque tube, for instance via a respective pin as shown at the example of FIG. 11, to configure a push-pull type configuration for causing torque tube rotation. It is envisioned that two solar trackers may be connected at their ends, three solar trackers may be connected at their ends, or two solar trackers may be connected at a single end. Although generally illustrated as being a push-pull type arrangement (e.g., where rotation of one torque tube causes the connecting rod to translate and thereby cause rotation of the other torque tube of the other row), it is envisioned that any type of connection that links the rotation of multiple distinct torque tubes may be utilized. As can be appreciated, the solar tracker system may include dampers arranged in any suitable configuration described elsewhere herein.

FIG. 12 is a plot of oscillations due to wind loading on a single tracker row with an end pier damper where the first mode (Mode 1) frequency is approximately 1.2519 Hz. FIG. 13 is a plot of oscillations due to wind loading on two rows of solar trackers with their ends coupled to one another and with end pier dampers where the first mode (mode 1) frequency is approximately 1.4241 Hz.

Figure 14:
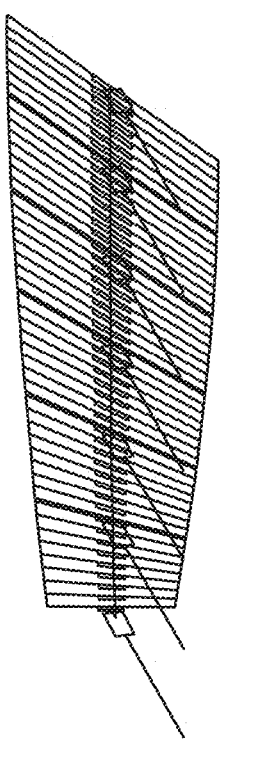
FIG. 14 is a plot of oscillations due to wind loading of a single solar tracker row without dampers.
Figure 15:
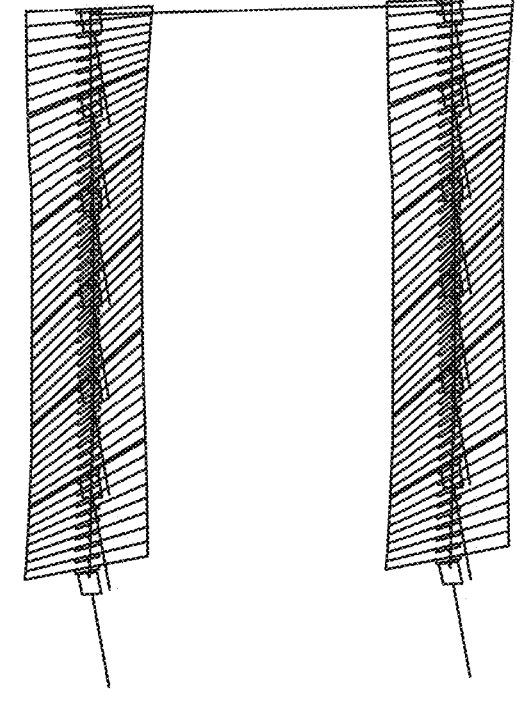
FIG. 15 is a plot of oscillations due to wind loading of two rows of solar trackers tortionally coupled to one another at each end without dampers.
Figure 16:
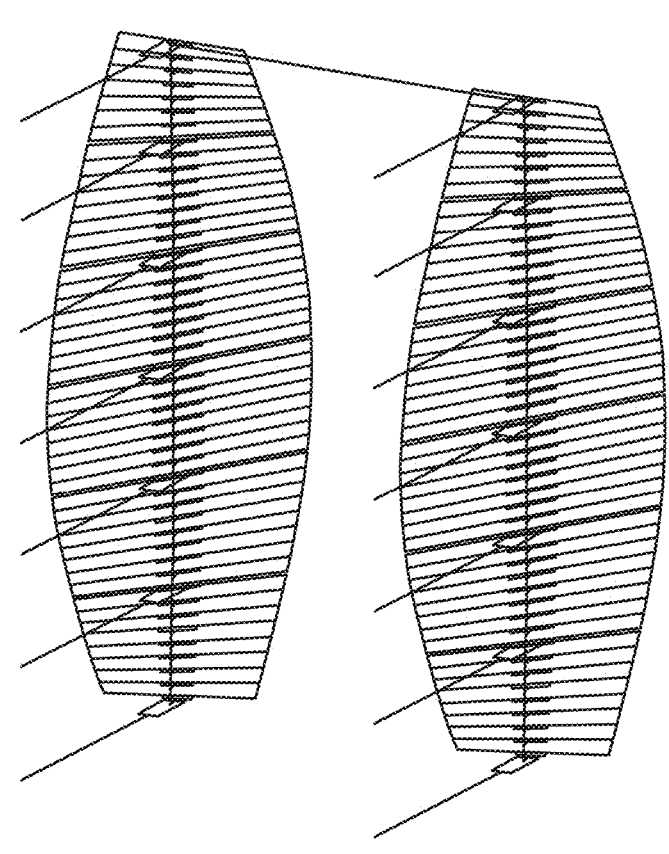
FIG. 16 is a plot of oscillations due to wind loading of two rows of solar trackers rigidly coupled to one another at each end without dampers.

FIG. 14 is a plot of oscillations due to wind loading of a single solar tracker row that does not use dampers on end piers, where the first mode (mode 1) frequency is approximately 0.72638 Hz. FIG. 15 is a plot of oscillations due to wind loading of two rows of solar trackers tortionally coupled to one another at each end and without dampers coupled to the end piers, where the first mode (mode 1) frequency is approximately 1.4239 Hz. FIG. 16 is a plot of oscillations due to wind loading of two rows of solar trackers rigidly coupled to one another at each end without dampers coupled to the end piers, where the first mode (mode 1) frequency is approximately 1.4239 Hz. In this embodiment, the rigid connection between each row is an idealized connection that locks all degrees of freedom including relative torsional motion between two connected rows. As illustrated in FIGS. 14-16, the gain in stiffness and consequently wind speed stability for the interconnected rows with end torsional restraint (1.42 Hz) is modest over the tracker configuration with a single pair of damper at the end of the row (1.25 Hz). But when compared to a baseline where no dampers are used (0.72 Hz), the increase is significant.

While several embodiments of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular embodiments.

What is claimed is:

1. A solar tracking system, comprising:
   a first solar tracker row, the first solar tracker row including:
   a plurality of support piers;
   a torque tube rotatably supported on the plurality of support piers;
   a plurality of solar modules coupled to the torque tube;
   at least one damper coupled to one of the plurality of support piers at a first end and coupled to a portion of the torque tube at a second, opposite end; and
   a first lever arm connected to the torque tube of the first solar tracker row at one first lever arm end and connected to a connecting rod at an another first lever arm end, wherein the first lever arm comprises a first pivot point rotatably connecting the one first lever arm end to the another first lever arm end, the first pivot point spaced apart from a rotational axis of the torque tube of the first solar tracker row;
   a second solar tracker row, the second solar tracker row including:
   a plurality of support piers;
   a torque tube rotatably supported on the plurality of support piers;
   a plurality of solar modules coupled to the torque tube;
   at least one damper coupled to one of the plurality of support piers at a first end and coupled to a portion of the torque tube at a second, opposite end; and
   a second lever arm connected to the torque tube of the second solar tracker row at one second lever arm end and connected to the connecting rod at an another second lever arm end, wherein the second lever arm comprises a second pivot point rotatably connecting the one second lever arm end to the another second lever arm end, the second pivot point spaced apart from a rotational axis of the torque tube of the second solar tracker row; and the connecting rod, the connecting rod coupled to the torque tube of the first solar tracker row at a first end of the connecting rod and coupled to the torque tube of the second solar tracker row at a second, opposite end of the connecting rod, such that rotation of the torque tube of the first solar tracker row effectuates movement of the connecting rod, which in turn, effectuates rotation of the torque tube of the second solar tracker row.

2. The system of claim 1, wherein the torque tube of the first solar tracker row extends along a first torque tube central longitudinal axis and the torque tube of the second solar tracker row extends along a second torque tube central longitudinal axis, wherein the connecting rod extends along a connecting rod central longitudinal axis, and wherein the connecting rod central longitudinal axis is transverse to the first torque tube central longitudinal axis and the second torque tube central longitudinal axis.

3. The system of claim 2, wherein the first torque tube central longitudinal axis is parallel to the second torque tube central longitudinal axis.

4. The system of claim 1, wherein the torque tube of the first solar tracker row is supported by at least one bearing housing assembly of the first solar tracker row, wherein the torque tube of the second solar tracker row is supported by at least one bearing housing assembly of the second solar tracker row, and wherein the first end of the connecting rod is coupled to the torque tube of the first solar tracker row at a first location that is spaced apart from the at least one bearing housing assembly of the first solar tracker row and the second end of the connecting rod is coupled to the torque tube of the second solar tracker row at a second location that is spaced apart from the at least one bearing housing assembly of the second solar tracker row.

5. The system of claim 1, wherein the first lever arm has a first lever arm width at the one first lever arm end connected to the torque tube of the first solar tracker row and has a second lever arm width at the another first lever arm end connected to the connecting rod, and wherein the second lever arm width is less than the first lever arm width.

6. The system of claim 5, wherein the second lever arm width at the another first lever arm end connected to the connecting rod is defined at least by a pair of brackets configured to rotatably connect to the one first lever arm end connected to the torque tube of the first solar tracker row.

7. The system of claim 1, further comprising:

a first pin rotatably connecting the one first lever arm end to the another first lever arm end; and a second pin rotatably connecting the one second lever arm end to the another second lever arm end.

8. The system of claim 1, wherein the first lever arm is connected to the torque tube of the first solar tracker row and connected to the connecting rod such that rotation of the torque tube of the first solar tracker row causes movement of the connecting rod which in turn causes rotation of the torque tube of the second solar tracker row.

9. The system of claim 8, wherein the first lever arm is connected to the torque tube of the first solar tracker row and connected to the connecting rod such that rotation of the torque tube of the first solar tracker row causes translation of the connecting rod which in turn causes the second lever arm to impart rotational movement to the torque tube of the second solar tracker row.

10. The system of claim 8, wherein the first lever arm is connected to the torque tube of the first solar tracker row and connected to the connecting rod and the second lever arm is connected to the torque tube of the second solar tracker row and connected to the connecting rod such rotation of one of the torque tube of the first solar tracker row and the torque tube of the second solar tracker row causes a push or pull force to be applied at the connecting rod which in turn causes rotation of the other of the torque tube of the first solar tracker row and the torque tube of the second solar tracker row.

11. The system of claim 1, wherein the at least one damper of the first solar tracker row is coupled to one of the plurality of support piers at the first end at a face of the one of the plurality of support piers that is spaced apart from a face of the one of the plurality of support piers that interfaces with the connecting rod.

12. The system of claim 11, wherein the at least one damper of the second solar tracker row is coupled to one of the plurality of support piers at the first end at a face of the one of the plurality of support piers that is spaced apart from a face of the one of the plurality of support piers that interfaces with the connecting rod.

13. The system of claim 12, wherein the at least one damper of the first solar tracker row extends in a first direction between the one of the plurality of support piers and the torque tube of the first solar tracker row, and wherein the at least one damper of the second solar tracker row extends in the first direction between the one of the plurality of support piers and the torque tube of the second solar tracker row.

14. A solar tracker system comprising:

a connecting rod that is configured to couple to a torque tube of a first solar tracker row at a first end of the connecting rod and to couple to a torque tube of a second solar tracker row at a second, different end of the connecting rod;

a first lever arm that is configured to connect to the torque tube of the first solar tracker row at one first lever arm end and to connect to the connecting rod at an another first lever arm end, wherein the first lever arm comprises a first pivot point rotatably connecting the one first lever arm end to the another first lever arm end, the first pivot point spaced apart from a rotational axis of the torque tube of the first solar tracker row; and a second lever arm that is configured to connect to the torque tube of the second solar tracker row at one second lever arm end and to connect to the connecting rod at an another second lever arm end, wherein the second lever arm comprises a second pivot point rotatably connecting the one second lever arm end to the another second lever arm end, the second pivot point spaced apart from a rotational axis of the torque tube of the second solar tracker row, wherein the connecting rod, the first lever arm, and the second lever arm are configured such that rotation of the torque tube of the first solar tracker row causes rotation of the torque tube of the second solar tracker row.

15. The system of claim 14, further comprising:

a first pin that is at the first pivot point and is configured to rotatably connect the one first lever arm end to the another first lever arm end; and a second pin that is at the second pivot point and is configured to rotatably connect the one second lever arm end to the another second lever arm end.

16. The system of claim 15, wherein the first lever arm includes a pair of brackets at the another first lever arm end that is configured to connect to the connecting rod, and wherein the pair of brackets is configured to receive the first pin to rotatably connect the one first lever arm end to the another first lever arm end.

17. The system of claim 14, wherein the first lever arm is configured to connect to the torque tube of the first solar tracker row and connect to the connecting rod such that rotation of the torque tube of the first solar tracker row causes translation of the connecting rod which in turn causes the second lever arm to impart rotational movement to the torque tube of the second solar tracker row.

18. The system of claim 14, wherein the first lever arm is configured to connect to the torque tube of the first solar tracker row and connect to the connecting rod and the second lever arm is configured to connect to the torque tube of the second solar tracker row and connect to the connecting rod such that rotation of the torque tube of the first solar tracker row causes a push or pull force to be applied at the connecting rod which in turn causes rotation of the torque tube of the second solar tracker row.

* * * * *